United States Patent
Johnston (10) Patent No.: US 9,214,845 B2
(45) Date of Patent: Dec. 15, 2015

(54) PROCESS FOR ANNEALING OF HELICAL WOUND CORES USED FOR AUTOMOTIVE ALTERNATOR APPLICATIONS

(71) Applicant: Gwynne Johnston, Barrington Hills, IL (US)

(72) Inventor: Gwynne Johnston, Barrington Hills, IL (US)

(73) Assignee: TEMPEL STEEL COMPANY, Chicago, IL (US)

( * ) Notice: Subject to any disclaimer, the term of this patent is extended or adjusted under 35 U.S.C. 154(b) by 182 days.

(21) Appl. No.: 13/793,565

(22) Filed: Mar. 11, 2013

(65) Prior Publication Data

US 2014/0250681 A1 Sep. 11, 2014

(51) Int. Cl.
*H01F 7/06* (2006.01)
*H02K 15/02* (2006.01)

(52) U.S. Cl.
CPC .............. *H02K 15/02* (2013.01); *H02K 15/026* (2013.01); *Y10T 29/4902* (2015.01)

(58) Field of Classification Search
CPC ...... B22F 3/18; B22F 2003/248; B22F 5/006; C21D 8/1222; C21D 8/1272; C21D 8/0273; C21D 6/00; C21D 8/0226; H01F 1/16; H01F 41/0213; H01F 27/25; H02K 15/02; H02K 15/026
USPC .............. 29/602.1, 33 K, 596, 598, 605, 732; 148/598, 600, 630, 645, 613–615
See application file for complete search history.

(56) References Cited

U.S. PATENT DOCUMENTS

| | | | |
|---|---|---|---|
| 2,348,003 | A | 5/1944 | Granfield |
| 3,283,399 | A * | 11/1966 | Hart et al. ...................... 29/605 |
| 4,779,812 | A | 10/1988 | Fisher et al. |
| 5,535,990 | A | 7/1996 | Burrage et al. |
| 5,542,995 | A * | 8/1996 | Reilly ............................ 148/630 |
| 5,609,696 | A | 3/1997 | Lauer et al. |
| 6,309,748 | B1 | 10/2001 | Lashmore et al. |
| 6,525,443 | B2 | 2/2003 | Asao |
| 6,566,781 | B2 | 5/2003 | Oohashi et al. |
| 6,792,666 | B1 | 9/2004 | Bolotinsky et al. |
| 6,879,080 | B2 | 4/2005 | Caamano |
| 7,144,468 | B2 | 12/2006 | Decristofaro et al. |
| 7,235,910 | B2 | 6/2007 | Decristofaro et al. |
| 7,471,182 | B2 | 12/2008 | Kumano et al. |
| 7,596,856 | B2 | 10/2009 | Berwald et al. |
| 8,138,877 | B2 | 3/2012 | Demolis et al. |
| 2008/0238242 | A1 | 10/2008 | Yoshizawa et al. |
| 2008/0246362 | A1 | 10/2008 | Hirzel |
| 2010/0102910 | A1 | 4/2010 | Waeckerle et al. |
| 2012/0248930 | A1 | 10/2012 | Wang et al. |
| 2012/0262021 | A1 | 10/2012 | Lafontaine et al. |
| 2013/0033146 | A1 | 2/2013 | Bender |

FOREIGN PATENT DOCUMENTS

| | | |
|---|---|---|
| CN | 102376425 A | 3/2012 |
| DE | 102006044436 A1 | 3/2008 |
| EP | 2187502 A1 | 5/2010 |
| WO | 9407295 | 3/1994 |

\* cited by examiner

*Primary Examiner* — Thiem Phan
(74) *Attorney, Agent, or Firm* — Schiff Hardin LLP

(57) ABSTRACT

In a method for manufacturing a helically wound alternator core, stamping an electrical steel strip to create a lamination strip having a back-iron and projecting teeth. The lamination strip is helically wound by bending to form the helically wound alternator core. The core is then welded. Thereafter the helically wound welded alternator core is annealed.

10 Claims, 6 Drawing Sheets

SURVEY STARTING FROM TOOTH EDGE AND MOVING TOWARDS BACK-IRON

| DEPTH BELOW SURFACE, IN | HARDNESS HV | HRB |
| --- | --- | --- |
| 0.0015 | 232 | 98 |
| 0.003 | 202 | 93 |
| 0.005 | 197 | 93 |
| 0.007 | 179 | 89 |
| 0.010 | 148 | 79 |
| 0.015 | 140 | 79 |
| 0.025 | 98 | 53 |

Conversions from HV to HRB taken from ASTM E140.

PROCESS FOR ANNEALING OF HELICAL WOUND CORES USED FOR AUTOMOTIVE ALTERNATOR APPLICATIONS

BACKGROUND

Figure 1:
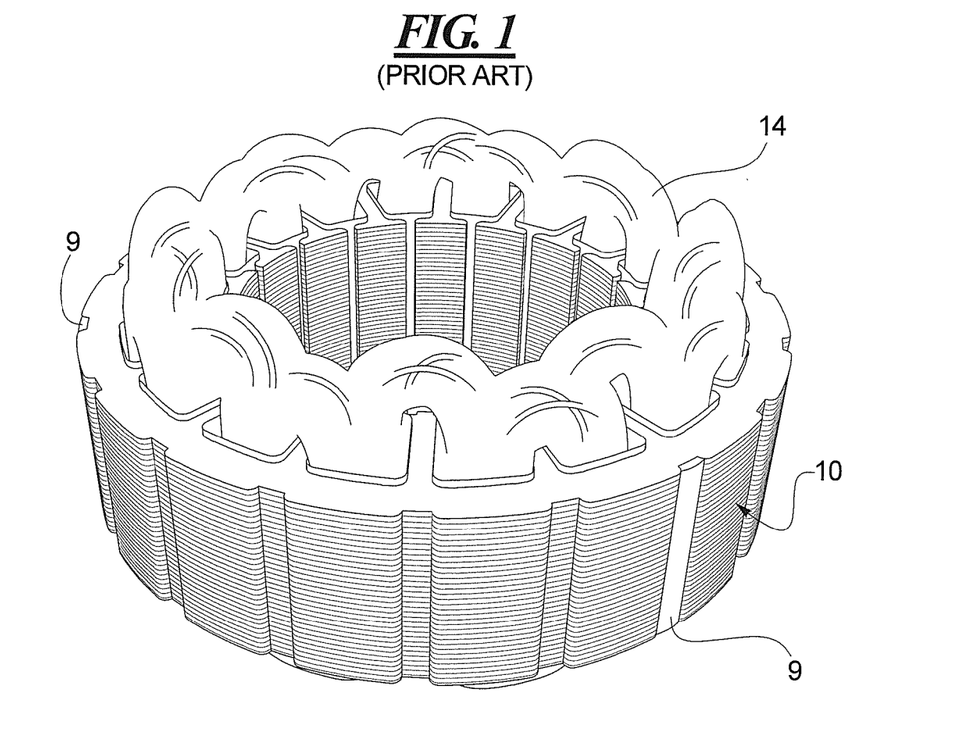
FIG. 1 illustrates in perspective a helical core with winding according to the prior art.
Figure 2:
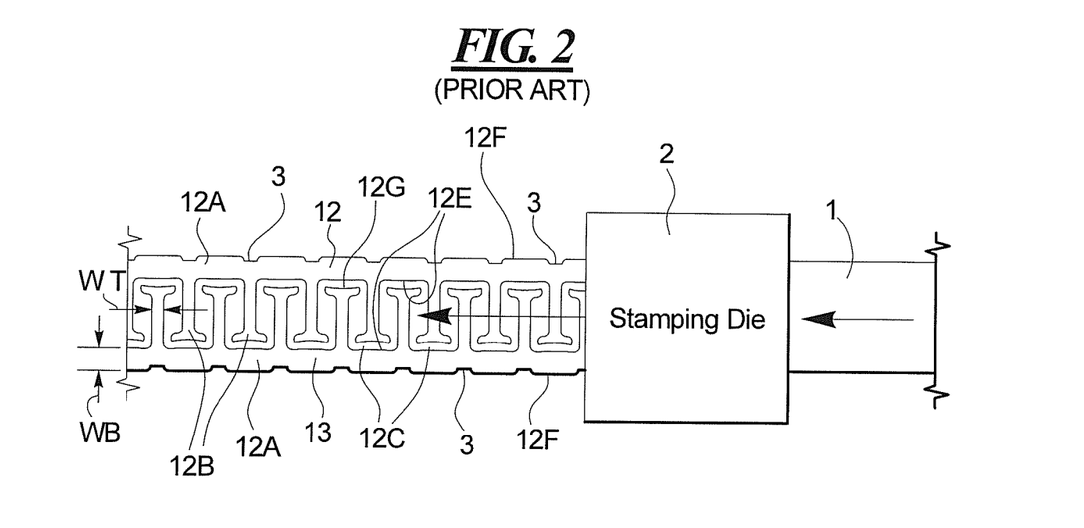
FIG. 2 is a top view of two electrical steel continuous strips, interlaced with each other, for use in winding a helical core.
Figure 3:
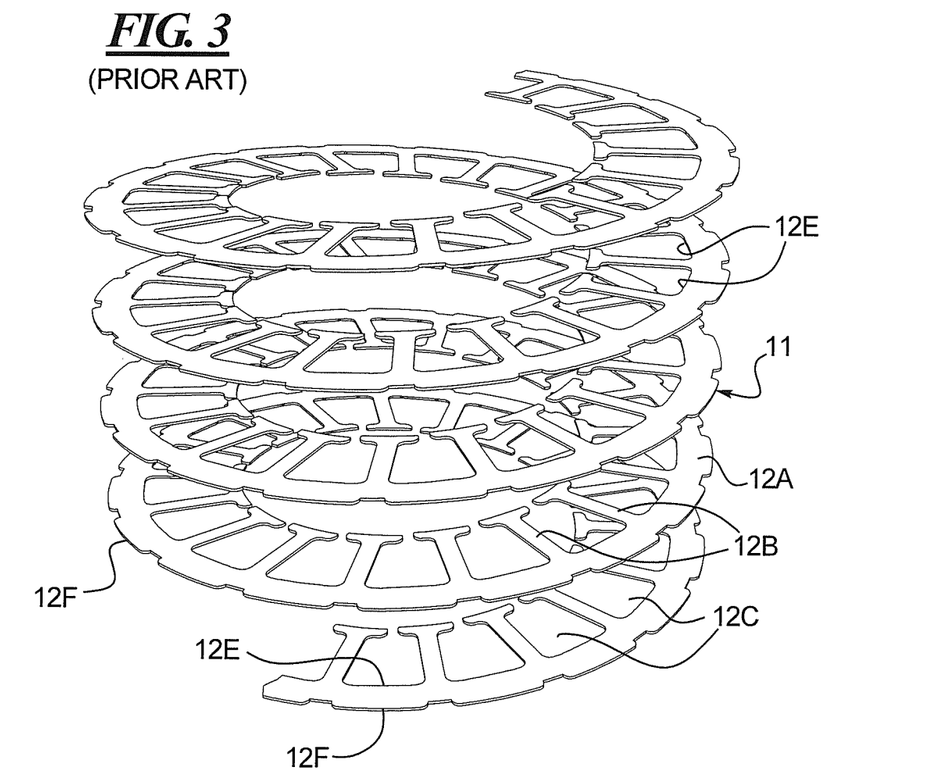
FIG. 3 is a perspective view of a helical winding for a helical core according to the prior art.
Figure 4:
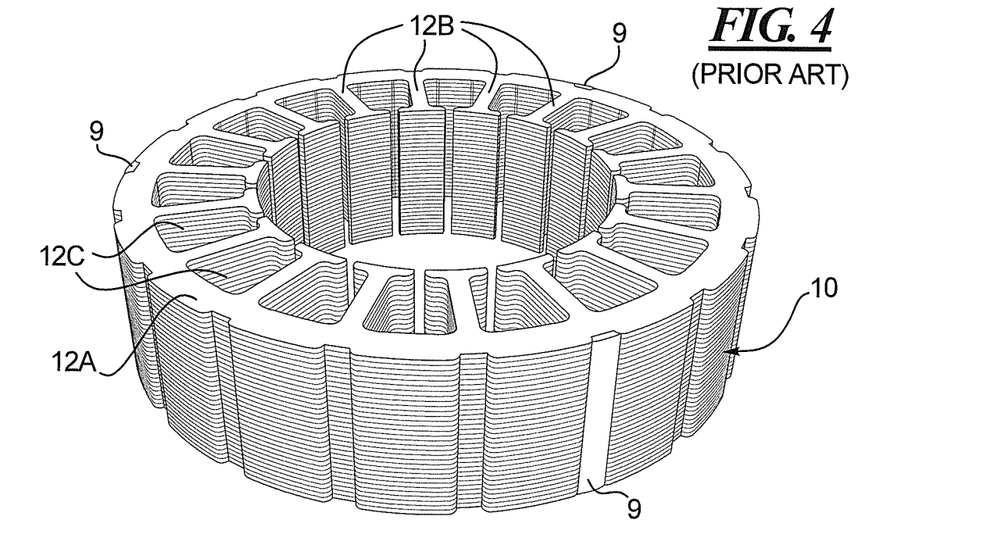
FIG. 4 is a perspective view of the prior art alternator helical core of FIG. 1 but without windings.

A majority of steel stator cores used for production of automotive alternators, such as shown in FIGS. 1 and 4 at 10 are produced using a well-established process called helical winding (albeit with some variations) such as shown at 11 in FIG. 3, that involves the following basic steps:

1) Slitting a thin width coil, typically 20 mm to 70 mm in width, from a wide coil of electrical steel where the thickness is typically 0.50 mm but which may vary from 0.35 to 1.00 mm.
2) Stamping with a stamping die 2 the slit coil 1 as shown in FIG. 2 to create two separate continuous strips 12 and 13 that are interlaced, but which are separated like a zipper. Some processes stamp and separate up to 4 continuous strips, wherein two opposing strips are interlaced and the boundary in the center between the two pairs of interlaced strips is straight. Each strip is comprised of a straight support section 12A (called the "back-iron") from which protrude teeth 12B which may be straight or look like "T" sections attached to the back-iron. The teeth end faces 12G have a slight concavity or curvature substantially matching a rotor peripheral curvature. Gaps 12C between the teeth are known as "slots" (see FIGS. 2 and 3). Indentations 3 are provided opposite the base of each tooth in the back-iron.
3) Winding each of the continuous strips, such as onto a central mandrel, such that each strip forms a helix 11 (with turns separated as shown in FIG. 3) which forms the helical core 10 (FIGS. 1 and 4), similar in concept to a child's toy popularly known as a "Slinky". After winding to a fixed core height (or mass), the continuous strip is cut, leaving an individual helical core 10.
4) Clamping and welding at for example separated locations 9 (FIGS. 1 and 4) around a periphery of the helical wound core to form the solid core 10 (FIG. 4).
5) Coining of the welded helical wound core to ensure consistent dimensions for the slot 12C openings and to impart any additional features on the faces of the core or on the edges leading into the slots.
6) A specially designed copper wire winding 14 (FIG. 1) is then inserted into the slots 12C (FIG. 4) of the finished helical wound core 10 to form the stator section of the alternator.

Over the last 15 years, the quality of steel used to manufacture alternator cores has improved from 1.00 mm commercial quality grades to the current use of 0.50 mm fully processed electrical steel, typically grades with core loss maximums of 8.00 watts/kg @1.5 Tesla, 50 Hz. Other grades and thicknesses are in use. The driving force for the reduction in steel thickness and the improvement in electrical properties is the increasing requirement for higher current output and higher efficiencies from automobiles that have an increasing requirement to support an increased number of electrical devices. However, the demand for higher output from the same weight and package size continues.

A normal approach taken by automotive manufacturers and Tier 1 suppliers for an increase in current output and efficiency is to increase the diameter and/or the core height of the helical wound core. Another option is to increase the number of slots in the helical wound core which allows a more efficient design of copper winding to be inserted. However, there is a limit as to how much weight can be added by increasing the mass of the alternator core. There is also a limit as to how many slots can be added to a core since there needs to be a balance between wire diameter, number of turns and the amount of steel used in the teeth of the core to establish sufficient electrical flux. So both of these design options appear, to those skilled in this art, to have reached limits, which do not seem to those skilled in this art to readily provide further options for increased current output. As indicated, some manufacturers have also used thinner electrical steels e.g. 0.35 mm, to reduce electrical losses and thereby increase current output. One of the problems with this approach is that the costs for manufacture of a helical wound core are inversely proportional to the thickness of the steel used. The reality is that the mechanics for successfully winding a helical core without crinkling the flat steel becomes much more difficult as the steel becomes thinner.

Figure 5A:
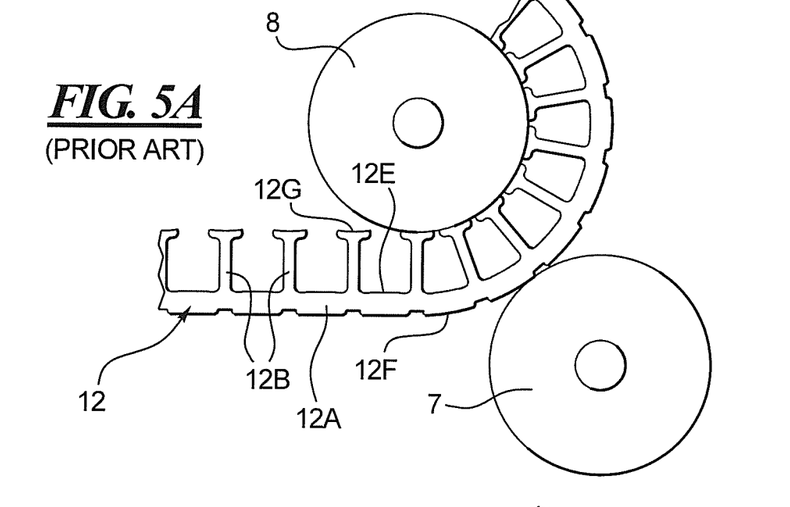
FIG. 5A and FIG. 5B are top views of two prior art methods for bending a lamination strip to form a helical core.

The difficulty in using the thinner electrical steel described above can best be understood by reference to FIGS. 5A and 5B. In FIG. 5A a first prior art method for helically winding a strip 12 is illustrated. An inside pressure wheel 8 is provided which contacts an outer edge 12G of the teeth 12B and exerts a force thereon. Also an outer pressure wheel 7 is provided which abuts against an outer edge 12F of the back-iron 12A of the strip 12. The strip is thus bent, resulting in internal plastic deformation in both the teeth 12B and within the back-iron 12A of strip 12. Inside pressure wheel 8 may also be a mandrel or have an associated mandrel about which the strip is helically wound.

Figure 5B:
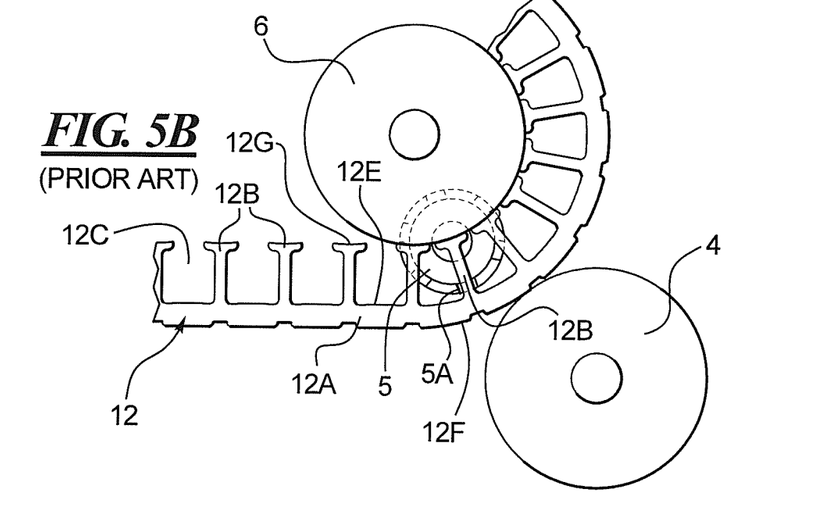

A second prior art method is shown in FIG. 5B which is known from U.S. Pat. No. 7,797,977. Here an outside pressure wheel 4 is provided along with a partial cone-shaped inside pressure wheel 5 having notches 5A. The notches 5A receive a base portion of the teeth 12B. A separate mandrel 6 is also provided to receive the helically bent strip. In this method the teeth 12B are not stressed by the bending (but are stressed by stamping) and plastic deformation still occurs in the back-iron 12A which is subjected to bending pressure by the inside pressure wheel 5 on the inner edge 12E of the back-iron 12A and pressure is also applied by the outside pressure wheel 4 on the outside edge 12F of the back-iron 12A. Thus plastic deformation occurs within the back-iron.

At present, only three companies in the world are known to be successfully winding helical cores with a steel thickness of 0.35 mm and no one is winding cores using thinner steel. So, while the demand for increased alternator output continues, the opportunity to obtain increased output using thinner electrical steels has appeared to be limited to 0.35 mm for both commercial and mechanical reasons.

Some manufacturers have examined the use of higher grade fully processed electrical steels. In theory, the lower electrical losses of these grades of steels, (especially at higher frequencies such as 200 to 600 Hz, which is the major part of the operating conditions for the alternator) should result in an increased current output. However, there is an anomaly, which is not understood by most manufacturers, such that the use of higher grades of electrical steel result in alternator performance that is either the same or not as good as alternator performance using regular grades with core loss maximums of 8.00 watts/kg @1.5 Tesla, 60 Hz. So again, while the demand for increased alternator output continues, the opportunity to obtain increased output using higher grade electrical steels has appeared, to those skilled in this art, to be limited.

SUMMARY

In a method for manufacturing a helically wound alternator core, an electrical steel strip is stamped to create a lamination strip having a back-iron and projecting teeth. The lamination strip is helically wound by bending the lamination strip to form the helically wound alternator core. The core is then welded. Thereafter the welded helically wound alternator core is annealed, or coined and then annealed.

DESCRIPTION OF EXEMPLARY PREFERRED EMBODIMENTS

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included.

It is known that both elastic stress and plastic deformation both increase core loss and adversely affect other magnetic properties of electrical steels. The effect can be very significant, especially in the case of plastic deformation.

The prior art manufacturing process by stamping and then bending the lamination strip to form a helical wound alternator core produces significant plastic deformation and strain in the back-iron 12A illustrated in FIGS. 2 and 3 by pressure applied at both the stamped edges 12E and/or 12F and possibly also to the teeth 12B by pressure at teeth edge 12G (first prior art bending method). Also the previously described bending methods introduce both elastic and plastic stress from compression of the core. The effects of stamping and bending in causing plastic deformation at stamped edges 12E, 12F and 12G can be clearly shown by a cross-section prior art photo-micrograph.

Figure 6:
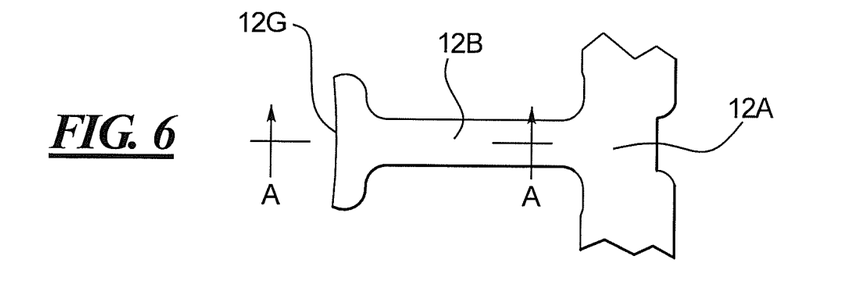
FIG. 6 is a top fragmentary view of a portion of a stamped tooth which also was subjected to a compression force by a first prior art bending method, and which extends from a back-iron.

FIG. 6 shows an illustration of a typical stamped stator tooth 12B extending from a back-iron 12A. If this tooth 12B is cross-sectioned through line AA using standard metallographic techniques, it is possible to make microhardness measurements in progressive steps from the stamped (or possibly compressed) edge 12G of the tooth into the middle of the tooth. FIG. 6 is thus a schematic of a typical stamped stator tooth illustrating the location of cross-section AA for FIG. 7.

Figure 7:
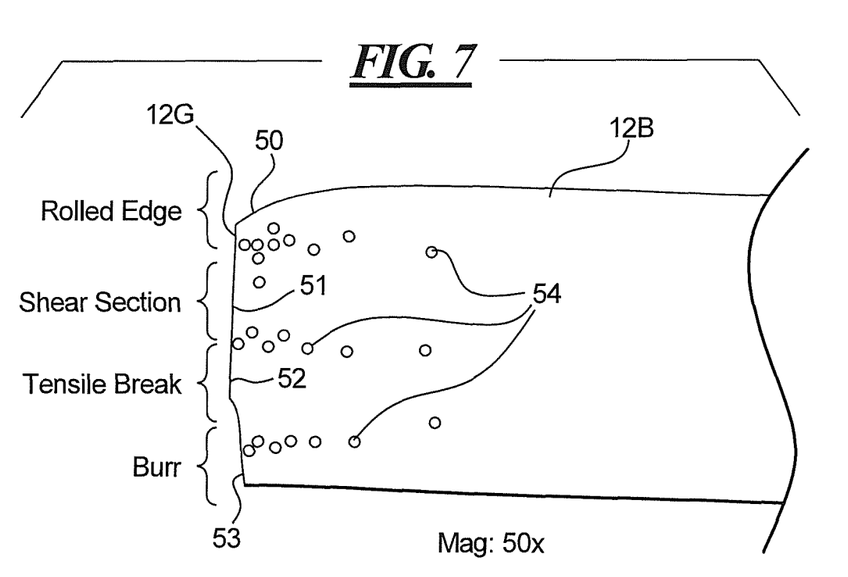
FIG. 7 is photo-micrograph section taken along section line A-A of FIG. 6 of the electrical steel strip tooth of a prior art helical core.

FIG. 7 (the photo-micrograph) shows the cross-section through the tooth 12B at a magnification of 50×. For those skilled in the art, FIG. 7 clearly shows the rolled edge 50 (resulting from the punch entry), the shear section 51 from the punch, the tensile break section 52, and the small burr 53 at the bottom as the punch exits the material. FIG. 7 also shows lines of black dots 54, each of which represents a microhardness reading shown in FIG. 8. Thus FIG. 7 is a cross-section photomicrograph at 50× magnification, of a typical stamped tooth 12B with the stamped edge 12G on the left. The black dots 54 (or squares) are the locations for each microhardness reading.

Figure 8:
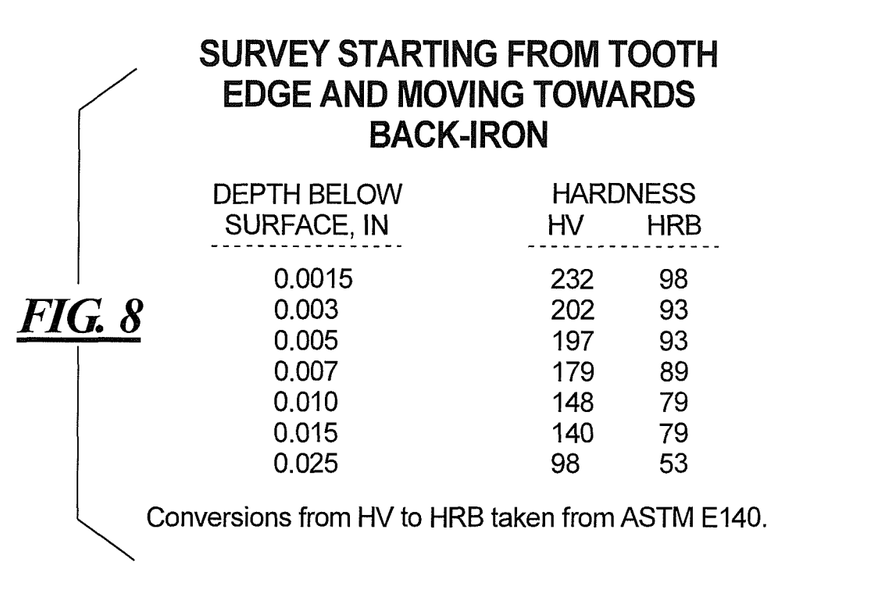
FIG. 8 is a table of micro-hardness data confirming the effect of plastic deformation being uniform next to an edge of the strip shown in the photo-micrograph of FIG. 7.

The table of FIG. 8 shows the results for one line of microhardness readings. The data shows that, at a distance of 0.0015" from the stamped edge 12G, the hardness reading is 232 HV (Vickers Hardness scale), and this reduces to 202 HV at 0.0030" from the stamped edge, and continues to decrease until a distance of 0.025" from the stamped edge is reached, where the hardness is 98 HV. The clear conclusion is that stamping has caused deformation adjacent to the stamped edge 12G and has resulted in an increased in hardness (and deformation) into the body of the tooth 12B. It is also clear that the same phenomenon occurs at each stamped edge 12E and 12F of the back-iron 12A.

In contrast to normal, non-helically wound motor cores, the width WT of the stator teeth (FIG. 2) and width WB of the back-iron 12A are relatively small for a helical wound alternator core. As a result, the ratio of plastically deformed steel compared to the total volume of steel is very high in a prior art helical wound alternator core. It is also known that flux is concentrated at the edges and surfaces of electrical cores (called the "skin effect"), and that the depth of the skin effect reduces as frequency is increased. This means that any plastic deformation on the edges and surface, especially in a helical wound core where the ratio of plastically deformed steel compared to the total volume of steel is very high, will result in a significant degradation of electrical properties for the steel.

Figure 9:
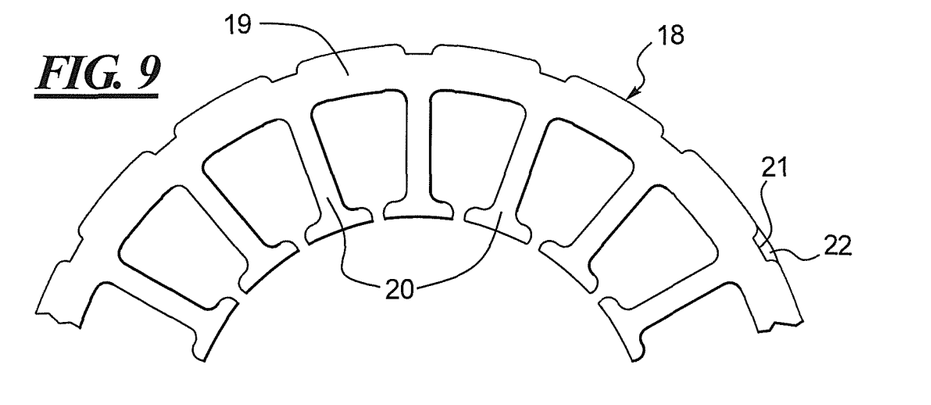
FIG. 9 is a fragmentary top view of a portion of a helically wound alternator core which has been annealed according to a preferred exemplary embodiment.

To solve the problem previously known in the prior art described above, according to a preferred exemplary embodiment a properly controlled annealing is provided to the lamination core having a helical lamination strip 18 after welding, as shown in FIG. 9, to relieve the stress and strain in the electrical steel material of the back-iron 19 and the projecting teeth 20 subjected to elastic strain and recrystallization at areas of plastic deformation caused by bending forces applied to the strip during helical winding. Indentations 21 are provided with a respective weld 22 before the annealing.

Figure 10:
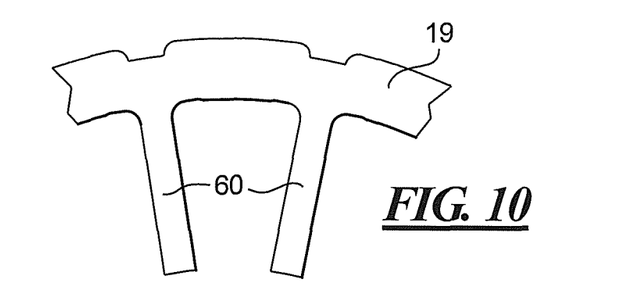
FIG. 10 is an alternate embodiment where the teeth extending from the back-iron are straight.

As shown in FIG. 10, instead of T-shaped teeth, the teeth may be straight as shown at 60 and have a'slight concavity at the stamped edge facing the rotor.

Figure 11:
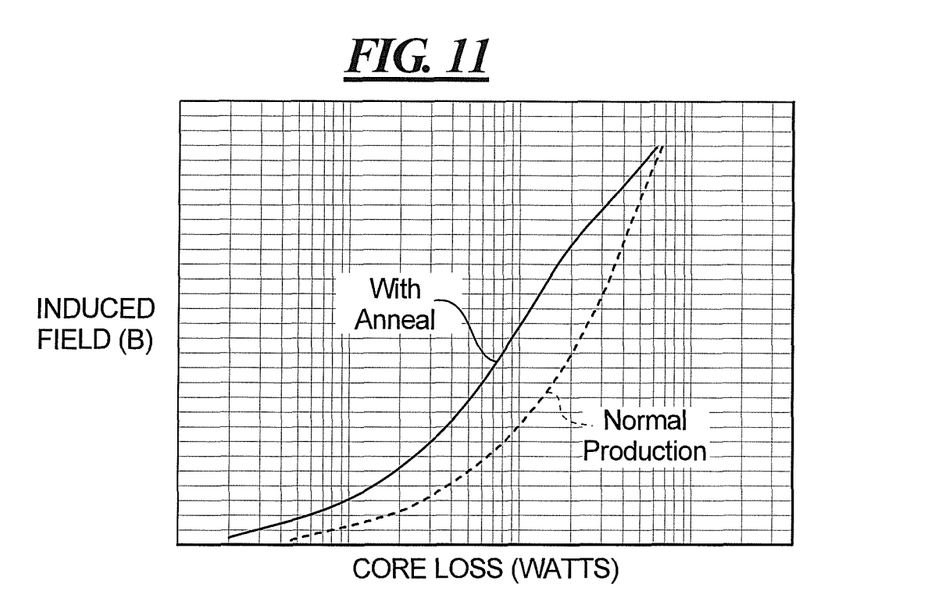
FIG. 11 is a graph comparing core loss versus induction for a helical wound alternator core manufactured using a normal prior art production method and a core that has been annealed according to a preferred exemplary embodiment.

Thus an important feature of this preferred exemplary embodiment is the application of controlled annealing to helical wound alternator cores. The result is a significant improvement in electrical properties of the steel, including core loss, which results in an increase in current output and increase in efficiency. This may be shown by the following plots of core loss vs. induction (FIG. 11) and induced field (B) vs. applied field (H) (FIG. 12) for both a core made using a regular prior art production process and a core that has been annealed under controlled atmosphere and temperature conditions according to a preferred exemplary embodiment. The plot of core loss vs. induction (FIG. 11) shows reduced losses for the annealed core at the same flux level (Induction). The plot of induced field (B) vs. applied field (H) (FIG. 12) shows that the annealed core carries a much higher flux or induced field (B) for a fixed level of applied field. The direct result or interpretation is that, for a fixed applied voltage in a stator or core winding the annealed core will provide a higher excitation current and consequently a higher efficiency. Thus FIG. 11 shows the comparison of Core loss vs. Induction for helical wound alternator cores using a regular or normal (prior art) production method and cores that have been annealed according to a preferred exemplary embodiment.

Figure 12:
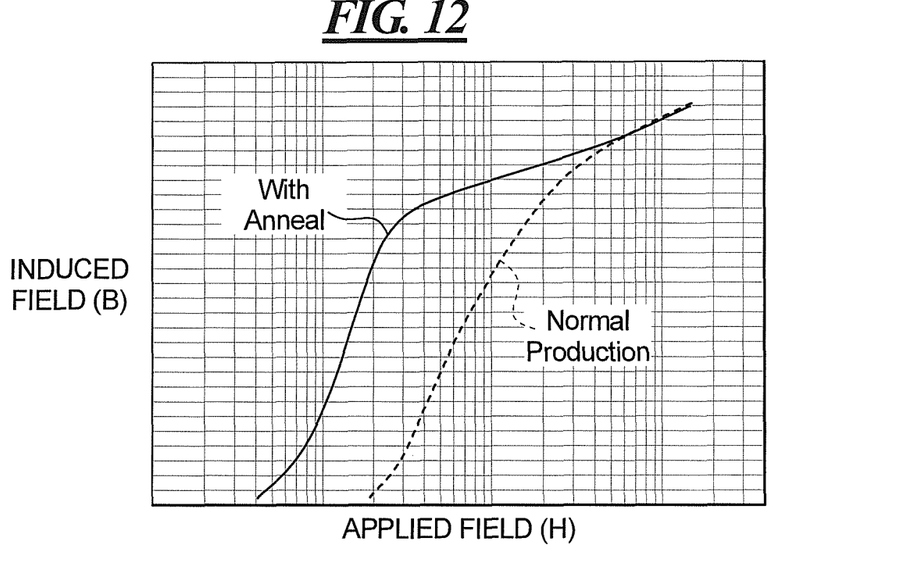
FIG. 12 shows a graph comparing induced field (B) versus supplied field (H) for a helical wound alternator core manufactured using a regular prior art production method and a core that has been annealed according to a preferred exemplary embodiment.

FIG. 12 shows the comparison or induced field (B) vs. applied field (H) for helical wound alternator cores using the regular or normal (prior art) production method and cores that have been annealed. Thus the situation and results are different for welded stacks of helically wound cores using regular or normal (prior art) production method and cores that have been annealed.

In prior art manufacturing of loose laminations, welding of a stack is performed after annealing. Welding is not performed before annealing. If welding of a stack is performed before annealing the core loss is usually worse. If the weld is made after annealing, the weld acts as a partial short circuit, but the resistance is high because of the fine-grained microstructure of the weld. If the weld is made before annealing, the grain size microstructure of the weld increases (as a result of annealing) and the resistance decreases, resulting in a greater short circuit and higher electrical losses. Note that this applies for the prior art manufacturing method of welded stacks of loose laminations.

It is believed no one has used a process for annealing of welded helically wound cores in the manner described herein.

Based on the above observations, one skilled in the art would previously have expected that the performance of a helically wound core that has been annealed after welding would be worse than normal production prior art cores (without annealing) in view of the short circuit effect described above. Surprisingly, however, it has been discovered this is not the case, as shown in FIGS. 11 and 12. Degradation of performance has been measured after annealing of older style prior art alternators using thick commercial quality steel which has high core losses. This fits the "short circuit model" but does not explain the improved performance using thinner fully processed electrical steels. One further anomaly is that, based on the "short circuit model", a helically wound core that is formed, annealed and then welded and coined, should give excellent results. In fact, the performance of cores produced using this sequence is not much better than cores made with the normal production method and without annealing.

It has been discovered that the improved performance of annealed, welded, helically wound cores (as opposed to the decreased performance of annealed, welded progressively stamped cores formed of a plurality of separate stacked laminations) is that the positive effects of the removal of plastic stress and strain from the body or back-iron of the core far exceed the negative effects of the reduced resistance or short circuit effects of the welds. The positive effect of removal of plastic stress and strain from the stamped edges as a result of annealing is the same in both cases.

The conditions for annealing of helically wound alternator cores are carefully defined and are similar to conditions for annealing of stacked, separate loose stator and rotor laminations and interlocked stacks, all using progressively stamped separate and stacked laminations.

Figure 13:
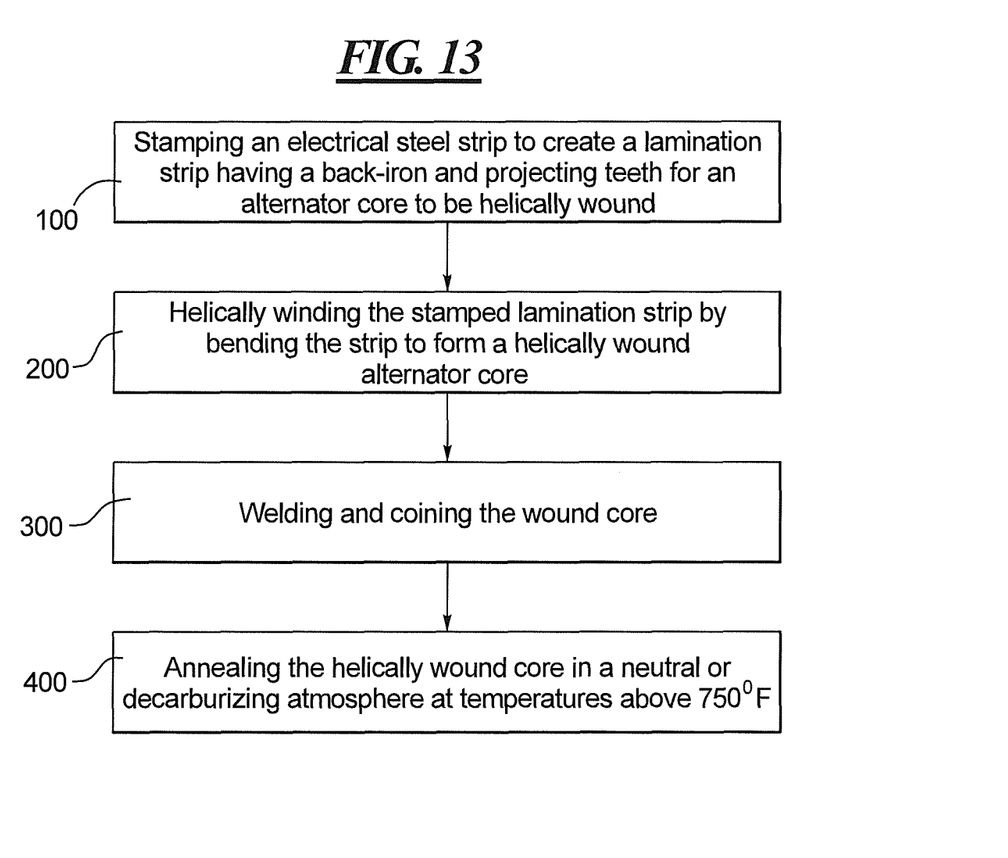
FIG. 13 is a flow chart according to a method of the preferred exemplary embodiment.

The method steps of the preferred exemplary embodiment are shown in FIG. 13. In step 100 a lamination strip having a thickness in a range from 0.35 mm to 1.00 mm, and preferably having a thickness of approximately 0.05 mm, and having a back-iron and projecting teeth for an alternator core to be helically wound is created by stamping. Thereafter in step 200, the stamped strip is helically wound by bending to form a helically wound alternator core. In step 300 the core is welded at peripherally spaced locations as in the prior art and also the space between adjacent teeth is coined. Then in step 400, the helically wound core is annealed in a neutral or decarburizing atmosphere at temperatures above 750° F. More particularly, the basic conditions for the annealing of the helically wound alternator cores include:

(a) A neutral or decarburizing atmosphere, which is preferably based on nitrogen, hydrogen/nitrogen combinations or atmospheres generated by controlled combustion of natural gas, propane or other similar hydrocarbon fuels; and (b) Temperatures above 750° F. (minimum temperature for stress relief in steel) and preferably in the range of 1300° F. to 1600° F. to allow for both stress relief and recrystallization to occur.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A method for manufacturing a helically wound alternator core, comprising the steps of:
    stamping an electrical steel strip to create a lamination strip having a back-iron and projecting teeth;
    helically winding the lamination strip by applying at least one force to the strip to bend the lamination strip to form the helically wound alternator core, said at least one force causing at least one area of plastic deformation resulting in internal stress and strain in at least said back-iron of the strip;
    welding the helically wound alternator core; and
    thereafter, annealing the welded helically wound alternator core in a neutral or decarburizing atmosphere at temperatures in a range of 1300° F. to 1600° F. which relieves the stress and strain and which causes recrystallization at said at least one area of plastic deformation caused by said at least one force which reduces electrical core loss.

2. The method of claim 1 wherein in addition to welding, the helically wound alternator core is also coined prior to said annealing, said coining ensuring consistent dimensions for slot openings or to add additional features on faces of the core or on edges leading into slots defined between teeth of the core.

3. The method of claim 1 wherein the helically winding comprises use of an inside pressure wheel which contacts an outer edge of said projecting teeth and exerts a force thereon, and also an outer pressure wheel which abuts against an outside edge of said back-iron, internal stress thus being created inside both said back-iron and said projecting teeth.

4. The method of claim 1 wherein said step of helically winding by bending the lamination strip comprises providing an outside pressure wheel contacting an outside edge of said back-iron and an inside pressure wheel having notches which receive a base portion of the teeth and apply a pressure to an inside edge of the back-iron, internal stress thus being created inside said back-iron.

5. The method of claim 1 wherein said projecting teeth are T-shaped.

6. The method of claim 1 wherein the electrical steel strip has a thickness in a range of 0.35 mm to 1.00 mm.

7. The method of claim 6 wherein the thickness is approximately 0.50 mm.

8. The method of claim 1 wherein said welding occurs at least two peripheral locations on the wound core.

9. The method of claim 8 wherein said two peripheral locations are defined by channel-like indentations where weld material for the respective weld is provided.

10. A method for manufacturing a helically wound alternator core, comprising the steps of:
   stamping an electrical steel strip to create a lamination strip having a back-iron and projecting teeth;
   helically winding the lamination strip by applying at least one force to the strip to bend the lamination strip to form the helically wound alternator core, said at least one force causing at least one area of plastic deformation resulting in internal stress and strain in at least said back-iron of the strip;
   welding and coining the helically wound alternator core, said welding and coining also causing internal stress and strain in at least said back-iron; and
   thereafter, annealing the welded helically wound alternator core in a neutral or decarburizing atmosphere at temperatures in a range of 1300° F. to 1600° F. which relieves the stress and strain and which causes recrystallization at said at least one area of plastic deformation caused by said at least one force which reduces electrical core less.

* * * * *